(12) United States Patent
Jeong et al.

(10) Patent No.: US 8,458,266 B2
(45) Date of Patent: Jun. 4, 2013

(54) SCHEDULING METHOD AND SCHEDULING INFORMATION SYNCHRONIZING METHOD IN WIRELESS AD HOC NETWORK

(75) Inventors: Wun-cheol Jeong, Daejeon (KR); Jong-moon Chung, Seoul (KR); Won-ju Choi, Seoul (KR); Ki-yong Jin, Seoul (KR); Min-seok Kim, Jeju (KR); Seong-soon Joo, Daejeon (KR); Jong-suk Chae, Daejeon (KR)

(73) Assignees: Electronics and Telecommunications Research Institute, Daejeon (KR); Industry-Academic Cooperation Foundation, Yonsei University, Seoul (KR)

( * ) Notice: Subject to any disclaimer, the term of this patent is extended or adjusted under 35 U.S.C. 154(b) by 311 days.

(21) Appl. No.: 12/626,803

(22) Filed: Nov. 27, 2009

(65) Prior Publication Data
US 2010/0268825 A1  Oct. 21, 2010

(30) Foreign Application Priority Data
Apr. 16, 2009 (KR) .................... 10-2009-0033328

(51) Int. Cl.
*G06F 15/16* (2006.01)
(52) U.S. Cl.
USPC .................... 709/206; 709/204; 709/226

(58) Field of Classification Search
USPC ........................... 709/206, 204, 226
See application file for complete search history.

(56) References Cited

U.S. PATENT DOCUMENTS

| 6,078,943 | A | 6/2000 | Yu | |
|---|---|---|---|---|
| 7,937,167 | B1 * | 5/2011 | Mesarina et al. | 700/78 |
| 8,031,615 | B2 * | 10/2011 | Ren et al. | 370/238 |
| 2008/0247408 | A1 * | 10/2008 | Yoon et al. | 370/408 |
| 2009/0010205 | A1 * | 1/2009 | Pratt et al. | 370/328 |
| 2009/0034432 | A1 * | 2/2009 | Bonta et al. | 370/255 |
| 2009/0135843 | A1 * | 5/2009 | Veillette | 370/406 |
| 2009/0245085 | A1 * | 10/2009 | Tao et al. | 370/208 |
| 2010/0182962 | A1 * | 7/2010 | Cheng et al. | 370/329 |

FOREIGN PATENT DOCUMENTS

KR  100695333 B1  3/2007

OTHER PUBLICATIONS

IEEE Computer Society, "Part 15.3: Wireless Medium Access Control (MAC) and Physical Layer (PHY) Specifications for High Rate Wireless Personal Area Networks (WPANs)", Sep. 29, 2003, pp. 1-315, IEEE Standards 802.15.3TM-2003, IEEE.

* cited by examiner

*Primary Examiner* — Nicholas Taylor (57) ABSTRACT

A decentralized scheduling method in a wireless ad hoc network is provided which includes grouping nodes in the network cluster by cluster, determining a cluster head of each cluster, and sequentially performing scheduling cluster by cluster. Accordingly, it is possible to provide an efficient cluster-based scheduling method which quickly adapts to changes and reduces power consumption.

13 Claims, 14 Drawing Sheets

SCHEDULING METHOD AND SCHEDULING INFORMATION SYNCHRONIZING METHOD IN WIRELESS AD HOC NETWORK

CROSS REFERENCE TO RELATED APPLICATION

This application claims the benefit under 35 U.S.C. §119 (a) of Korean Patent Application No. 10-2009-0033328, filed on Apr. 16, 2009, the disclosure of which is incorporated by reference in its entirety for all purposes.

BACKGROUND

1. Field

The following description relates to a wireless ad hoc network, and more particularly, to a decentralized scheduling method in a wireless ad hoc network.

2. Description of the Related Art

For an efficient communication between nodes in motion in an ad hoc network, transmission collision between neighboring nodes has to be minimized and each node needs to be assigned as many time slots as possible.

In the ad hoc network, however, each node can only recognize its adjacent nodes. Accordingly, to perform collision-free resource allocation, a central control node collects information about all nodes belonging to the network and allocates the resources to the nodes in a centralized scheduling and resource allocation method.

Although such a resource allocation method may consider all possible collision situations, an excessive load is imposed on the central control/maintenance node, which is time consuming and energy consuming. Further, if a new node moves in the network, a new resource allocation is required for the entire wireless network for collision-free communication between the nodes.

SUMMARY

The following description relates to a resource allocation method capable of solving a significant increase in operations for resource allocation and in messages to be exchanged between nodes in an increased network.

Furthermore, the following description relates to a scheduling method of nodes in a wireless ad hoc network which is capable of reducing rescheduling time of the entire network when a new node is added or a schedule is changed in the network.

Accordingly, in one aspect, there is provided a scheduling method of nodes in a wireless ad hoc network, including: forming a plurality of clusters including at least one node within the network; selecting a cluster head from among nodes included in each of the clusters; and allocating, by the selected cluster head, resources to nodes cluster by cluster.

The scheduling method may further include, after completing the resource allocation, transmitting, by the cluster head, a cluster head message including scheduling information to is other nodes within a cluster which the cluster head belongs to.

The scheduling method may further include: transmitting, by at least one edge node of the cluster in which the resource allocation has been completed, the scheduling information to an edge node of a cluster which is subject to a next scheduling; and transmitting, by the edge node of the cluster which is subject to the next scheduling, the scheduling information to a cluster head of the cluster, wherein the cluster head of the cluster which is subject to the next scheduling reflects the scheduling information to resource allocation to other nodes within the cluster.

According to another aspect, there is provided a synchronizing method of changed schedule information within a network with a plurality of distributed clusters, including: receiving, by a cluster head, hop counts for nodes within a corresponding cluster; setting a largest of the hop counts as a broadcast hop count; determining a synchronized change frame number larger than a largest number of hops within the network to simultaneously apply a frame length of the changed schedule information within the network; and transmitting, by the cluster head, a cluster head message including the synchronized change frame number and the frame length of the changed scheduling information to nodes within a cluster.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

According to an exemplary scheduling method, the entire network is divided into a plurality of clusters each of which is assigned identification information, such as cluster ID or address, to be used in determining resource allocation priority. In this case, resources are sequentially allocated cluster by cluster using a broadcast scheduling algorithm (BSA). Upon resource allocation, each cluster receives through its edge node some of the scheduling information from the preceding cluster. Accordingly, it is possible to quickly perform collisionfree resource allocation in a large-scale network.

Figure 1:
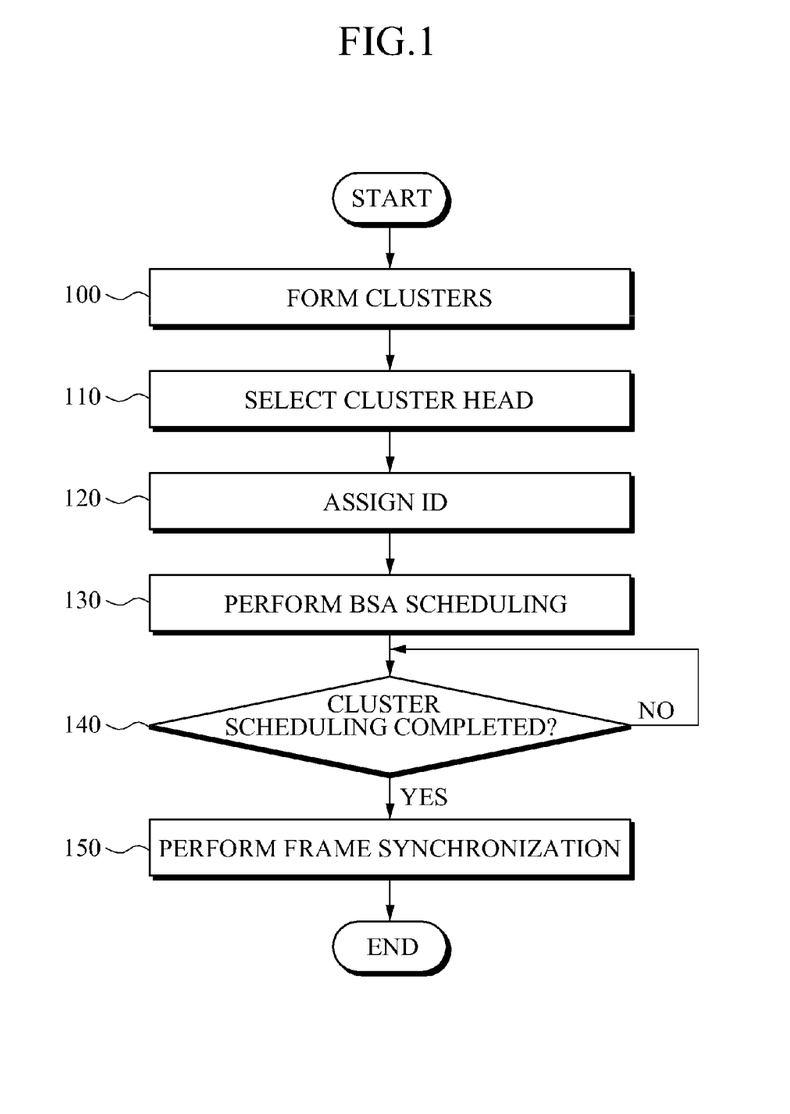
FIG. 1 is a flow chart of a scheduling method according to an exemplary embodiment of the present invention.

FIG. 1 is a flow chart of a scheduling method according to an exemplary embodiment of the present invention.

In operation 100, nodes are grouped cluster by cluster in an ad hoc network. In operation 110, a cluster head (CH) is selected to control each of the clusters. In operation 120, each cluster head is assigned ID to identify each cluster head. The cluster head may be a node with a greatest number of linked nodes in the cluster.

In the current example, ID may be sequentially assigned to a cluster head in order of the number of nodes linked to the cluster head. That is, a higher priority is given to a cluster head with more nodes linked thereto.

In operation 130, the resource allocation priority is determined through collection and exchange of information between the selected cluster heads and the resource allocation is performed cluster by cluster using Broadcast Scheduling Algorithm (BSA). In the current example, the resource allocation may be performed on an ID basis. Scheduling is performed for each cluster using BSA.

Examples of BSA include Mean Field Annealing (MFA), Hopfield Neural Network and Genetic Algorithm (HNN-GA), and Fuzzy Logic and Hopfield Neural Network (FHNN).

Figure 2:
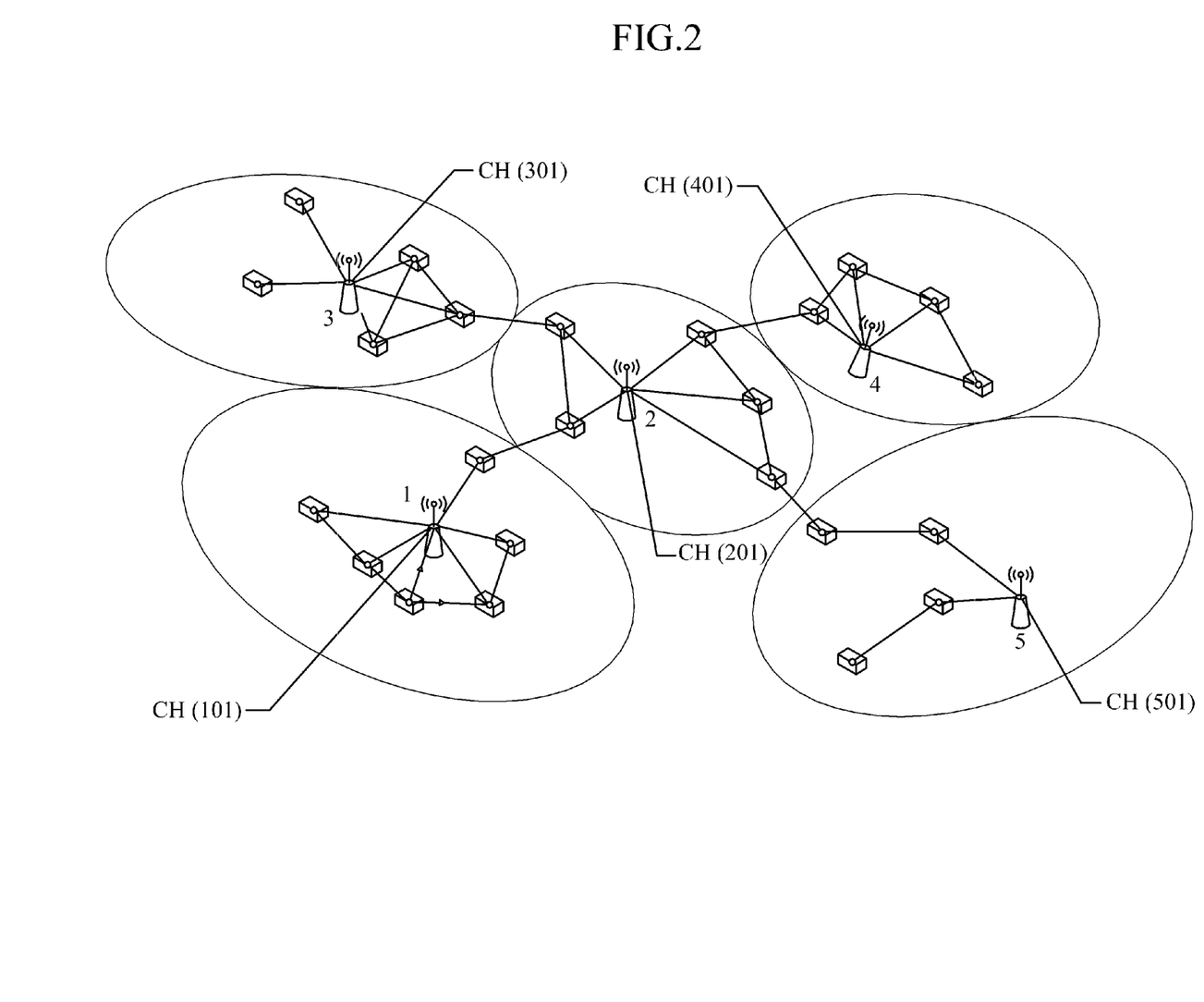
FIG. 2 illustrates a network employing a scheduling method according to an exemplary embodiment of the present invention.

FIG. 2 illustrates a network employing a scheduling method according to an exemplary embodiment of the present invention. As shown in FIG. 2, cluster heads are assigned IDs in order of most to least nodes linked to the cluster heads. That is, a cluster head with a greatest number of linked nodes is first assigned ID. In FIG. 2, cluster head IDs are assigned in order of 1→2→3→4→5.

In the current example, a cluster head of each cluster collects link information from nodes belonging to its own cluster and performs resource allocation while avoiding collision against neighboring nodes.

Figure 3:
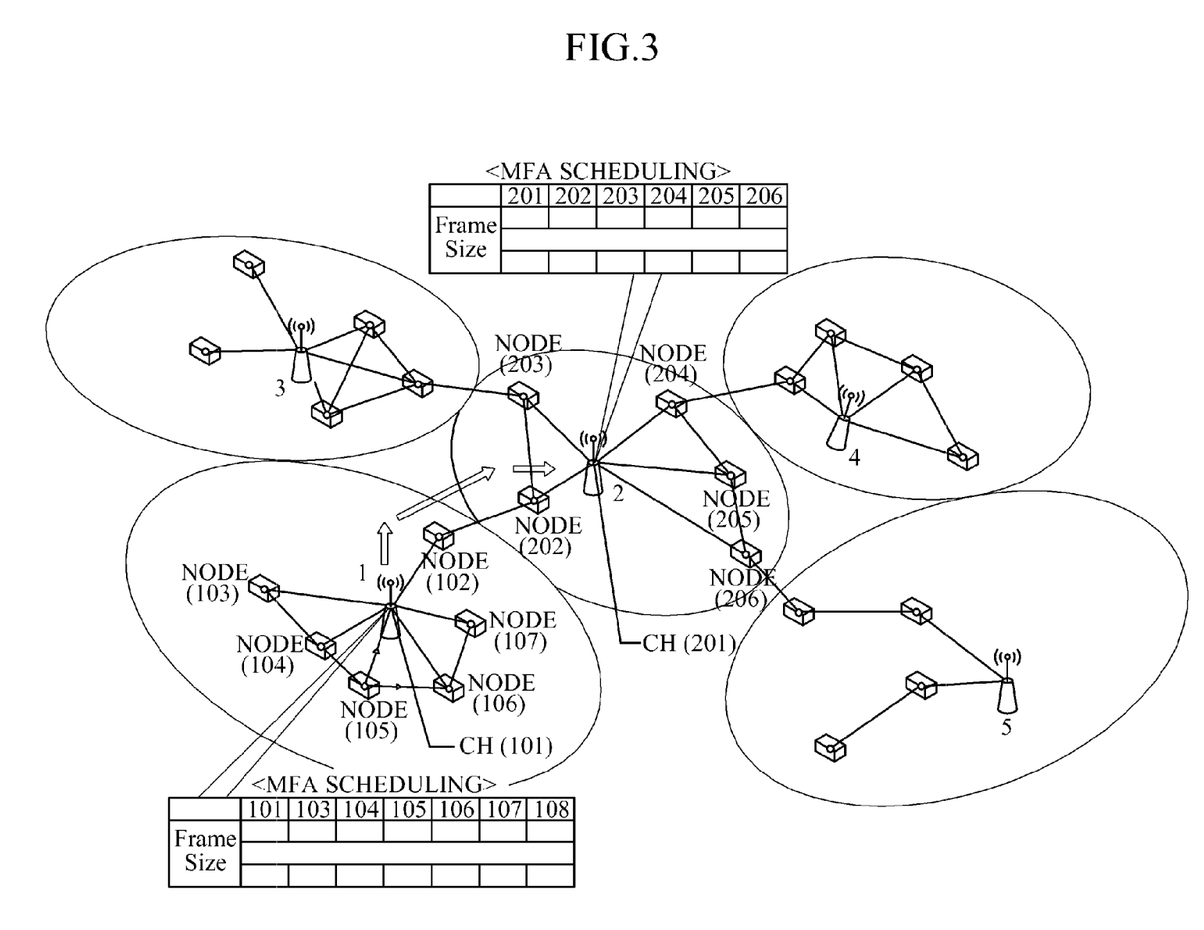
FIG. 3 illustrates a scheduling transmission process between clusters according to an exemplary embodiment of the present invention.

FIG. 3 illustrates a scheduling transmission process between clusters according to an exemplary embodiment of the present invention.

Referring to FIG. 3, Cluster 1 first performs resource allocation. The resource allocation is performed in the same process as a resource allocation process using a conventional BSA. Cluster 2 then performs resource allocation using BSA while avoiding collision with nodes belonging to Cluster 1. The selected cluster head is a reference node which is required in a first phase on BSA.

To execute BSA, information needs to be obtained beforehand so as not to allocate resources to nodes which are expected to collide with. Conventionally, in FIG. 3, Cluster Head 1 has to transmit cluster information to Cluster Head 2. According to an exemplary scheduling method, however, in order to minimize complexity and power consumption, an edge node 102 in Cluster 1 provides information about its own cluster and a transmission schedule to an edge node 202 in Cluster 2 which is located within two hops from the edge node 102.

Since the information is transmitted to neighboring cluster heads, the cluster head may consider schedules of cluster edge nodes to perform BSA scheduling for nodes within its corresponding cluster, thereby avoiding transmission collision.

Figure 4:
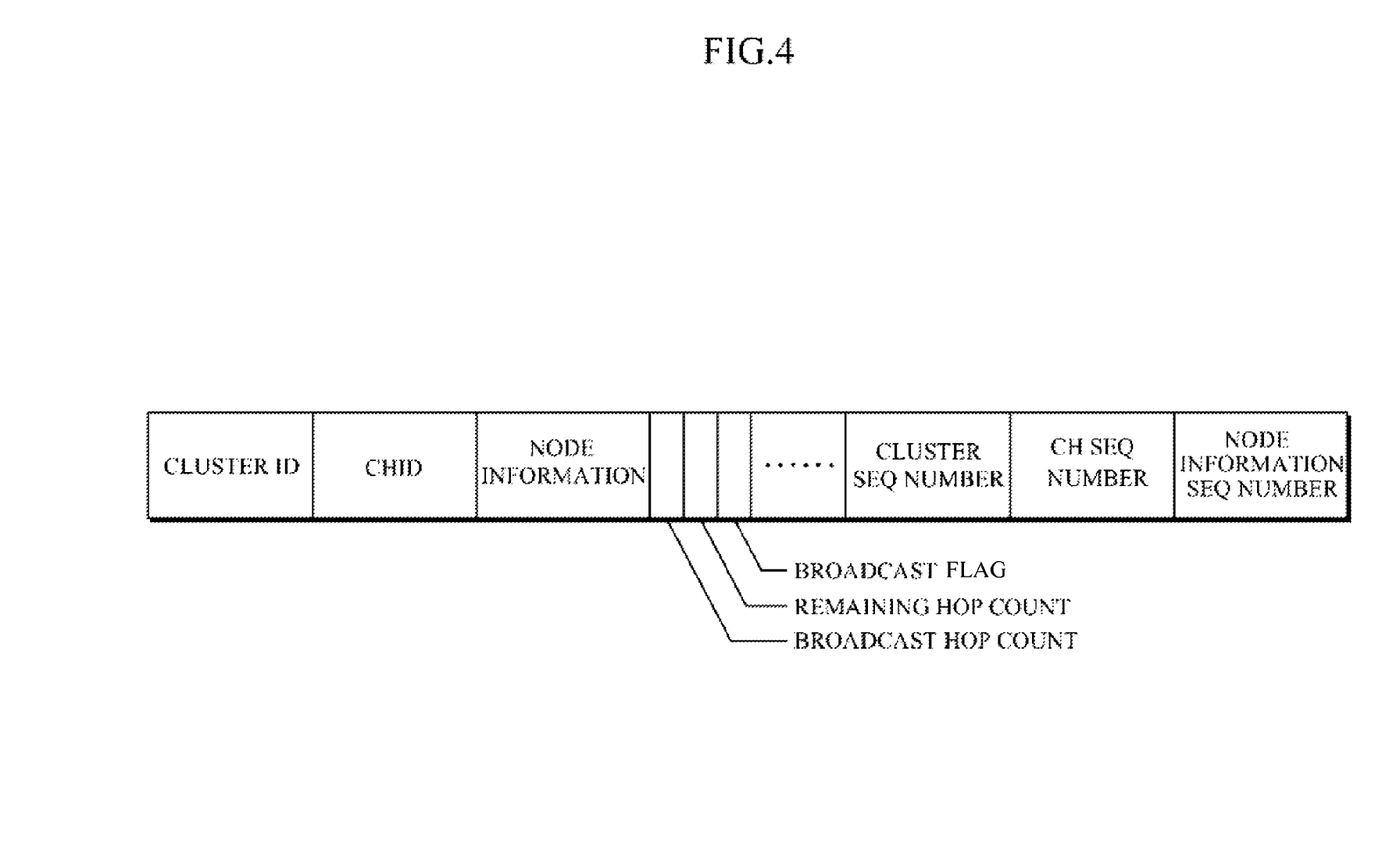
FIG. 4 illustrates a cluster head message according to an exemplary embodiment of the present invention.
Figure 5:
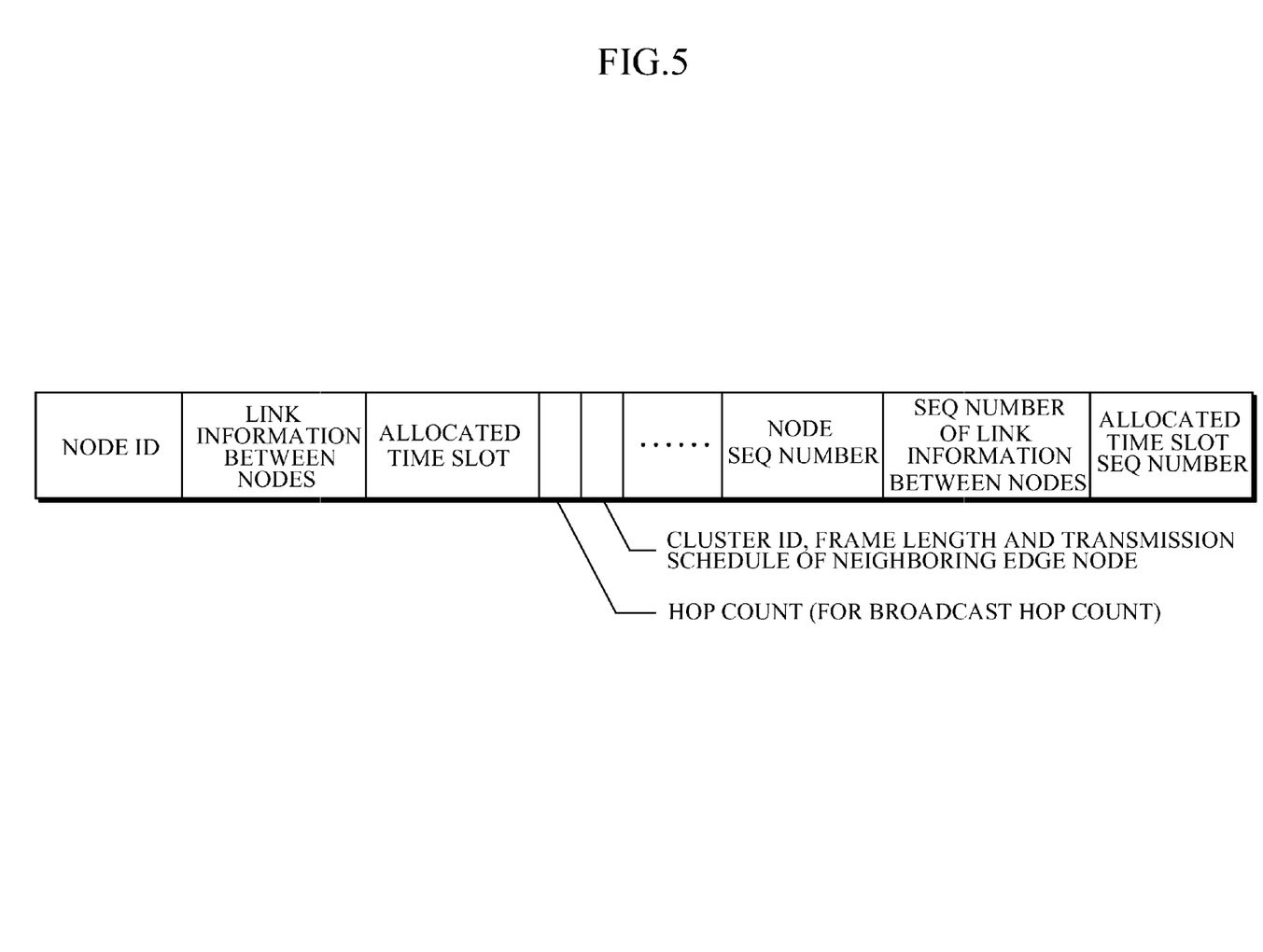
FIG. 5 illustrates an edge node message according to an exemplary embodiment of the present invention.

FIG. 4 illustrates a cluster head message according to an exemplary embodiment of the present invention. FIG. 5 illustrates an edge node message according to an exemplary embodiment of the present invention.

Referring to FIG. 4, the cluster head message includes a cluster ID, a broadcast hop count, a remaining hop count, and a broadcast flag of 0 or 1. Referring to FIG. 5, the edge node message includes a node ID, a link between nodes, a hop count for broadcast hop count, a cluster ID of a neighboring edge node, a frame length, and a transmission schedule.

In the current example, the broadcast flag is set to 0 when a cluster head message is used in a cluster to send control information for network operation or to inform a new schedule. A message with a broadcast flag of 0 is sent to all nodes within the cluster. On the other hand, the broadcast flag is set to 1 when the cluster head message is sent to all nodes within the entire network, i.e., to other clusters.

Upon initial network setup, an edge node sets a hop count of an edge node message to 1 when sending the edge node message to a cluster head. Intermediate nodes increase one by one the hop count of the edge node message when forwarding/routing the edge node message to the cluster head.

Hence, when receiving the edge node message, the cluster head may determine an edge node, which has sent the edge node message, and a hop count distance. At this time, a highest hop count is set to a broadcast hop count of the cluster. The broadcast hop count is used when the cluster head performs broadcasting and multicasting to all nodes belonging to the cluster.

The broadcast hop count is used when a frame size of a network is adjusted and a changing time of a transmission schedule is determined. When the hop count of the edge node message sent by the edge node is changed by adding a new node to the cluster or getting nodes out of the cluster, the cluster head updates the broadcast hop count of the cluster.

Upon initial schedule setup, each cluster head uses the broadcast hop count which is used in sending a message within its corresponding cluster.

The cluster head uses the broadcast hop count and the remaining hop count to prevent a transmit message from escaping from the cluster. The remaining hop count is calculated based on the broadcast hop count.

The broadcast hop count and the remaining hop count are included in a message which is sent by the cluster head. A broadcast hop count of a cluster may be changed by its cluster head. The cluster head changes the hop count necessary for broadcasting or multicasting within the cluster. The remaining hop count is equal to an initial broadcast hop count when the cluster head sends a message. However, the remaining hop count decreases one by one when the cluster message is sent to the next node hop by hop within the cluster. If the hop count becomes 0, the node no longer sends the message.

A cluster head, which has to change a frame length, sets an upper limit of the number of hops of the entire network to a broadcast hop count of a cluster head message, performs frame synchronization, and transmits it together with a frame number. In this case, the cluster head forwards the cluster head message with a broadcast flag set to 1 to all nodes within the entire network. A cluster head message with a broadcast flag set to 0 is a message which is set to be only transmitted within a corresponding cluster by a broadcast hop count of the cluster.

The cluster head message, the node message, and the edge node message use a sequence number, which is increased one by one when a new message is transmitted. If the same message is received twice or more, a node compares the messages by node ID, cluster ID and message sequence number. If the messages are determined to be the same, a firs message is considered but the remaining is ignored.

Figure 6:
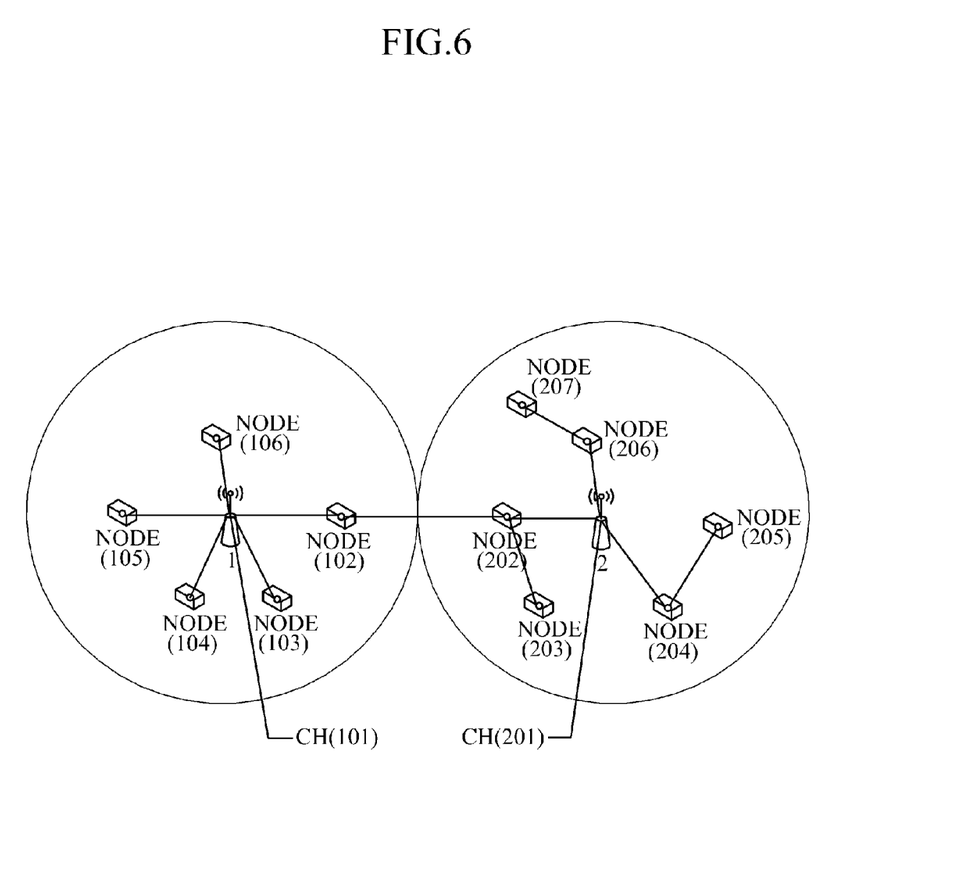
FIG. 6 illustrates a network system for performing a scheduling method according to an exemplary embodiment of the present invention.

FIG. 6 illustrates a network system for performing a scheduling method according to an exemplary embodiment of the present invention.

Referring to FIG. 6, for a network consisting of two clusters, cluster heads 101 and 201 exchange information about cluster schedule and frame length through edge nodes 102 and 202.

Figure 7:
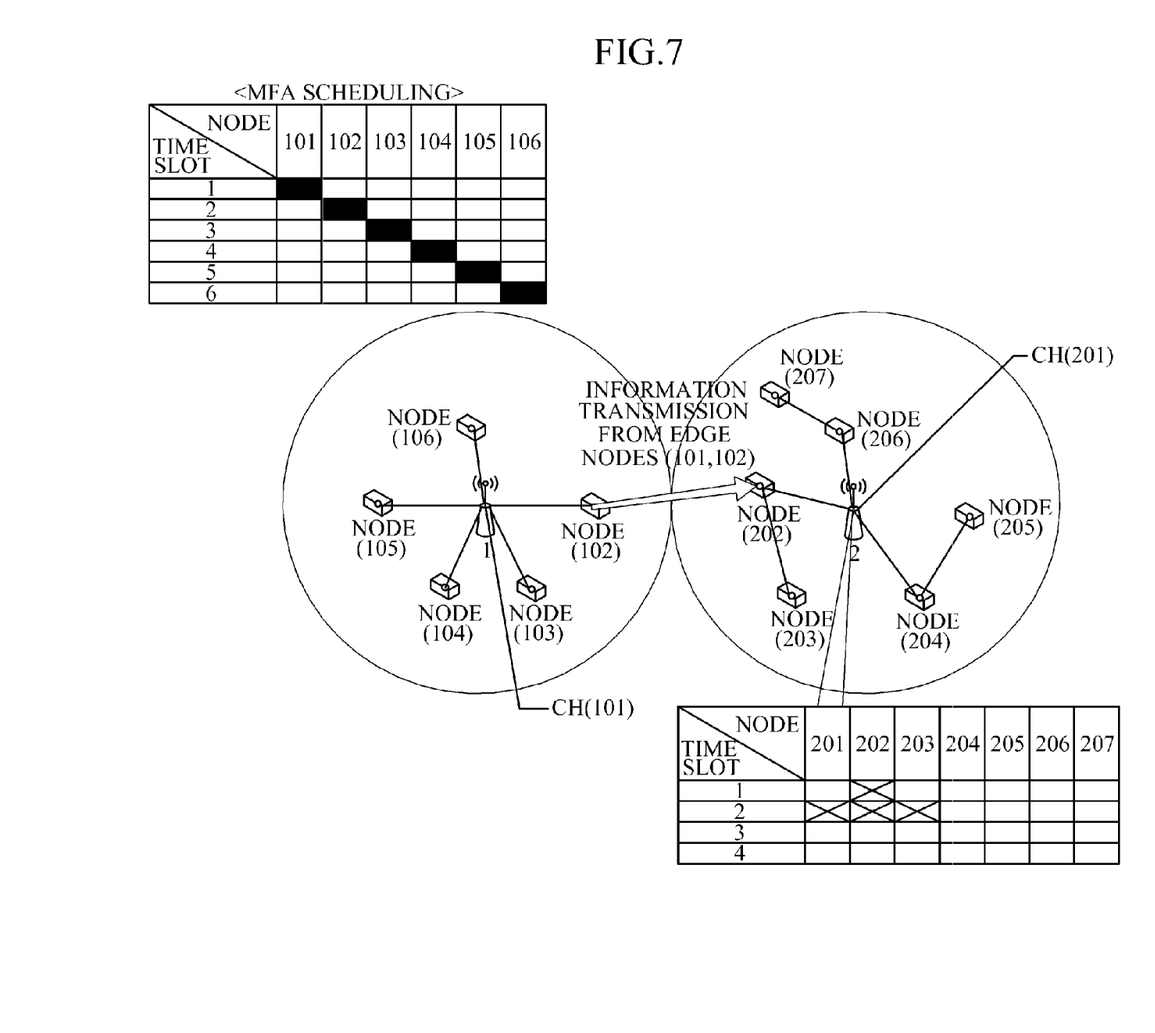
FIGS. 7 and 8 illustrate a collision-free scheduling method according to an exemplary embodiment of the present invention.
Figure 8:
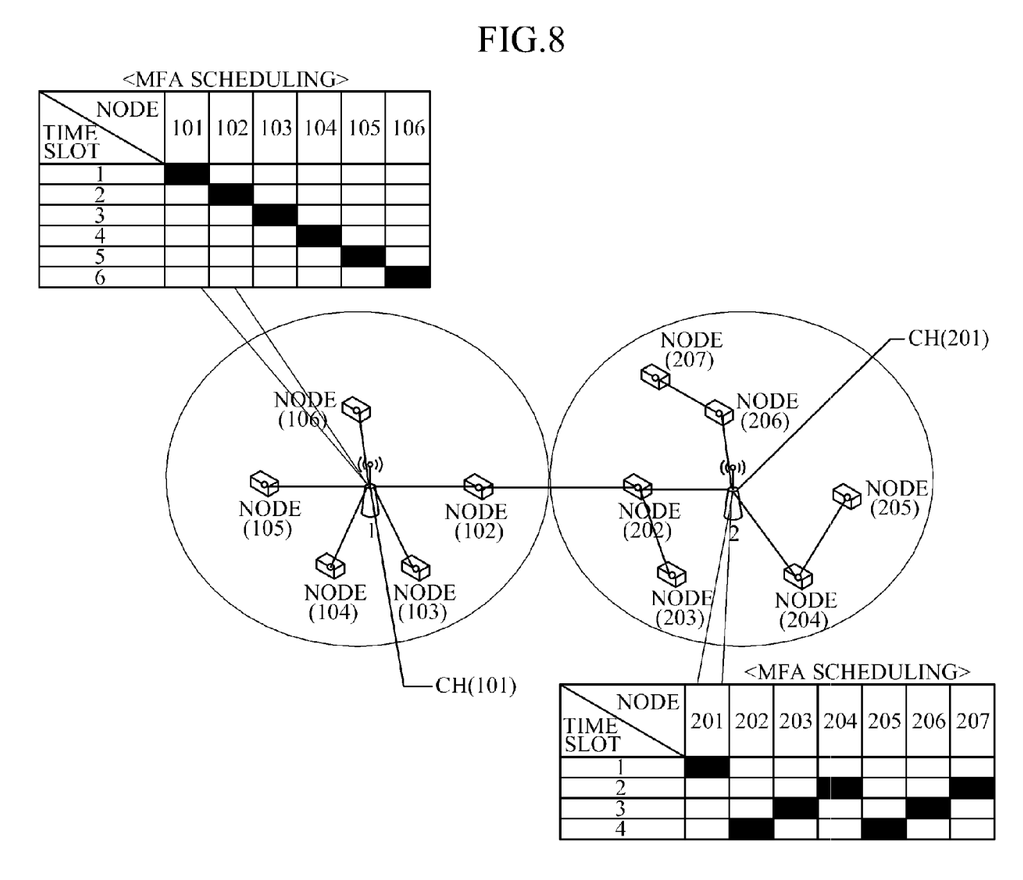

FIGS. 7 and 8 illustrate a collision-free scheduling method according to an exemplary embodiment of the present invention.

A cluster head has priority information which is assigned cluster by cluster. Cluster 1 first performs scheduling based on BSA using link information of nodes within Cluster 1. After Cluster 1 completes scheduling, information about the completed schedule is broadcast by the cluster head within Cluster 1. Accordingly, all nodes belong to Cluster 1 may have the schedule information.

The node 102, which is an edge node of Cluster 1, generates an edge node message including information about a frame length and transmission scheduling of the edge node to the node 202, which is an edge node of Cluster 2, based on the schedule information from the cluster head 101.

When receiving the edge node message from the node 102, the node 202 may determine the fact that the node 102 belongs to Cluster 1, the transmission schedule of the node 102, and the frame length in Cluster 1. As a result, when collecting link information about Cluster 2, the cluster head 201 of Cluster 2 may perform scheduling based on the information without transmission collision with Cluster 1. Referring to FIG. 8, the BSA-based scheduling may prevent transmission collision between the nodes.

As described above, the scheduling is sequentially performed in each cluster in order of assigned cluster IDs. As a result, the schedule of the entire network may be determined in this manner.

In short, the scheduling is performed cluster by cluster in order of assigned cluster head IDs taking into account scheduling of neighboring clusters. Accordingly, although the scheduling is performed cluster by cluster, transmission collision between nodes belonging to different clusters may be avoided.

After Cluster 2 performs the scheduling, a necessary frame length may be longer than a frame length of Cluster 1. After the node 201, which is a cluster head of Cluster 2, performs scheduling for Cluster 2, all nodes in Cluster 2 receive from the cluster head node 201 a cluster head message including the scheduling information about all of the nodes in the cluster.

The edge node 102 of Cluster 1 receives, from the node 202, information about the transmission schedule of the node 202 and the frame length of Cluster 2, together with information that the node 202 belongs to Cluster 2. The node 102 forwards the information received from the node 202 to the cluster head node 101. In this case, the cluster head node 101 may recognize that the frame length has been extended, and then perform an operation of adjusting the frame length. In this manner, the frame length of the entire network may be adjusted to a longest frame length. This contributes to frame synchronization so that communication may be properly made even though the cluster is disintegrated.

Figure 9:
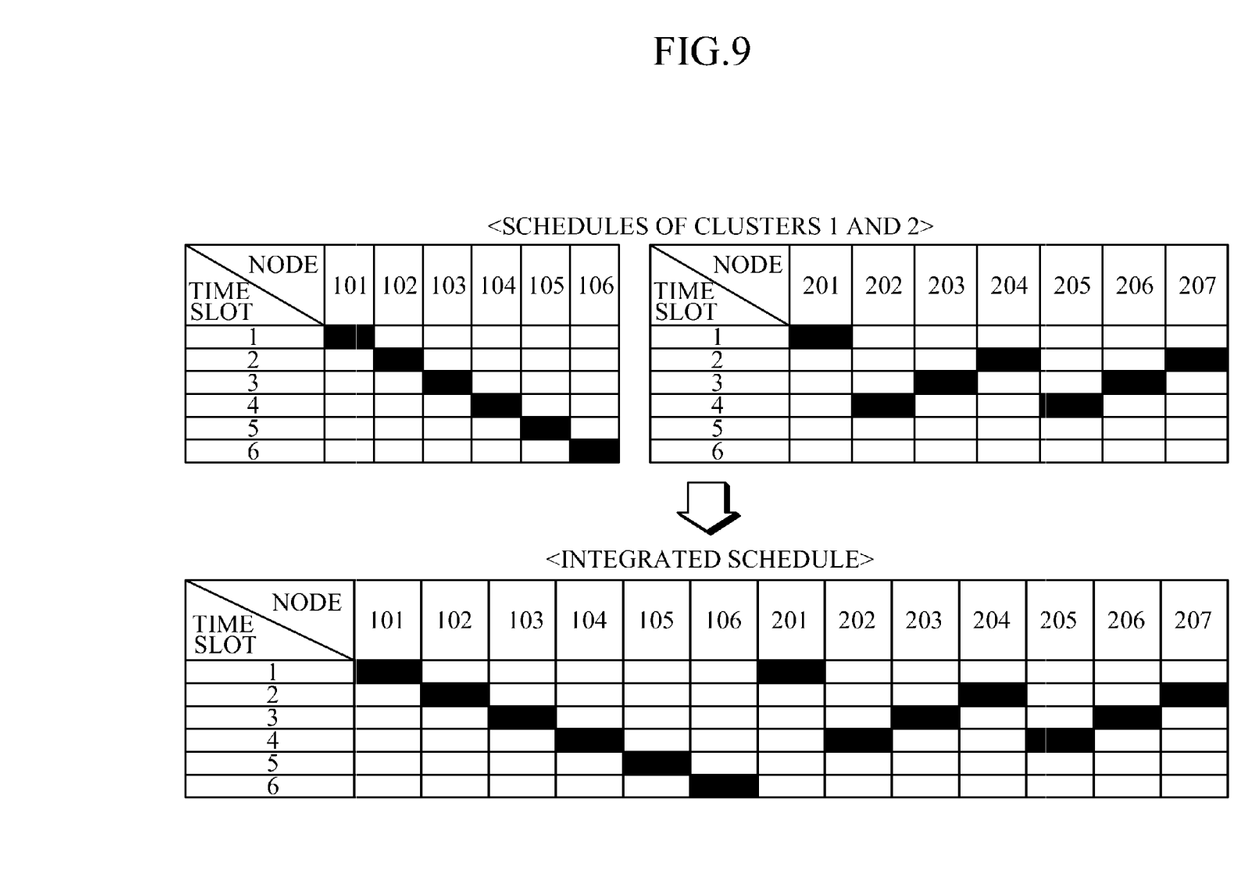
FIG. 9 illustrates a change in schedule information due to cluster integration according to an exemplary embodiment of the present invention.

FIG. 9 illustrates a change in schedule information due to cluster integration according to an exemplary embodiment of the present invention.

Referring to FIG. 9, while Cluster 2 needs four time slots, Cluster 2 has a maximum number of time slots of Cluster 1, i.e., six time slots. Accordingly, the scheduling may be normally performed when schedules of Cluster 1 and Cluster 2 are integrated.

For an extended part of the frame length after the frame synchronization, each cluster may further perform scheduling using BSA for the nodes in the cluster to provide improved service quality. If there is a change in a cluster after the scheduling/resource allocation for the entire network, rescheduling is only performed for the cluster rather than for the entire network. Hence, it is possible to reduce transmission rescheduling time in a large-scale network. Further, it is very efficient in terms of complexity due to the number of transmission messages. In addition, it is possible to significantly reduce the power consumption.

Hereinafter, a scheduling information synchronizing method will be described with reference to FIGS. 10 to 14 when scheduling information is changed due to a change in a network structure which is caused by addition of a new node or generation of a new link.

Figure 10:
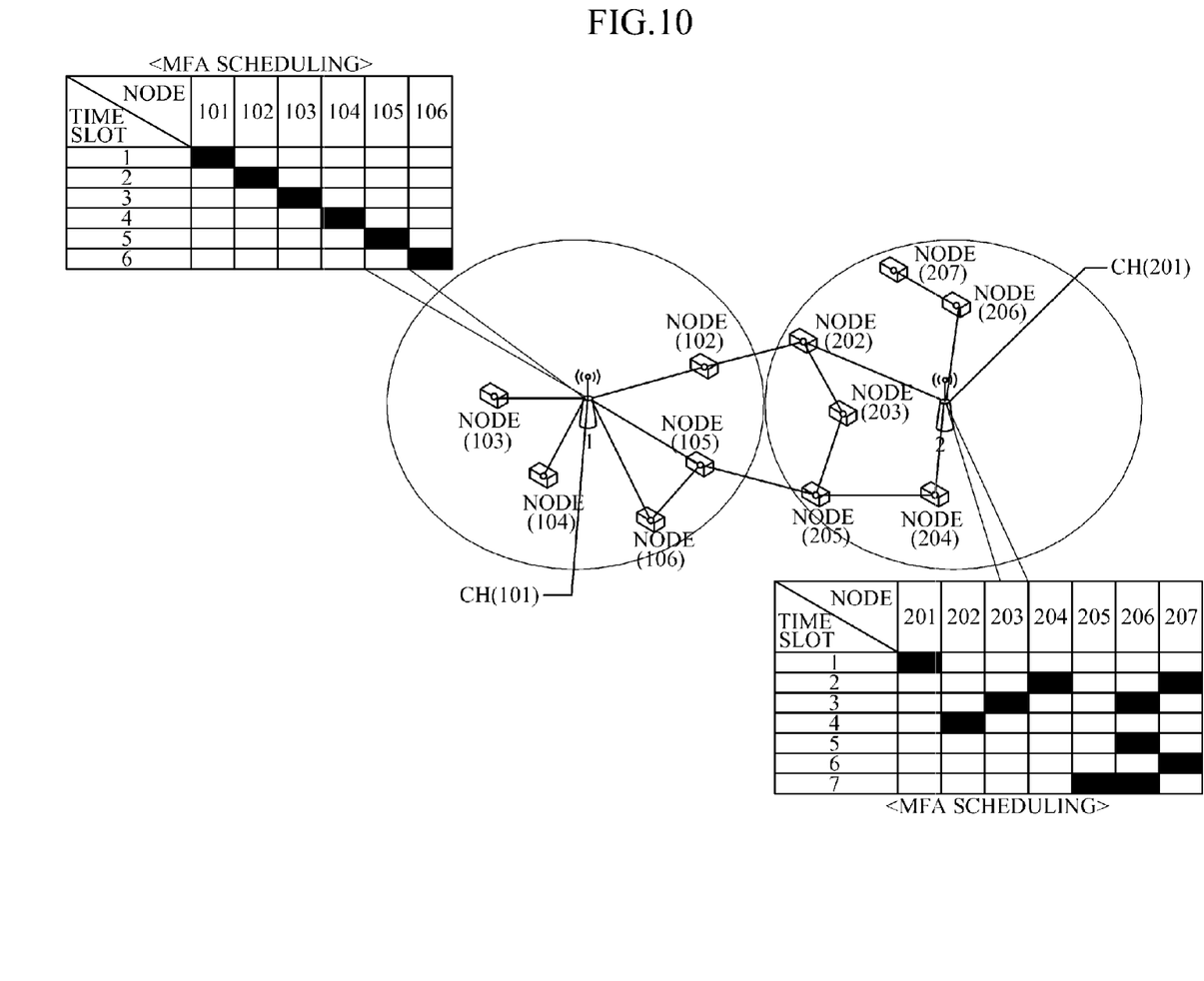
FIG. 10 illustrates a schedule synchronizing method for a changed network structure according to an exemplary embodiment of the present invention.

FIG. 10 illustrates a scheduling synchronizing method for a changed network structure according to an exemplary embodiment of the present invention. Referring to FIG. 10, if there is a change in a network link structure, resource reallocation is performed for a corresponding cluster, i.e., Cluster 2, rather than for the entire network. If a frame length of a cluster becomes larger than a reference frame length, changed information has to be sent to other clusters within the network so that the entire network may uniformly have a new reference frame length.

The process of adjusting the frame length will now be described in more detail. To maintain a reliable communication quality in an ad hoc communication, all clusters in the entire network have to use a new, uniform frame length and a new schedule which are different from an existing frame length and an existing schedule. Accordingly, the time when the new frame length and schedule are applied has to be determined.

If a cluster changes its frame length without notifying it to other clusters, transmission signals interference is generated between the clusters, thereby degrading communication performance of a network system. Accordingly, all of the clusters have to simultaneously change the frame length to maintain the frame synchronization within the network.

Figure 11:
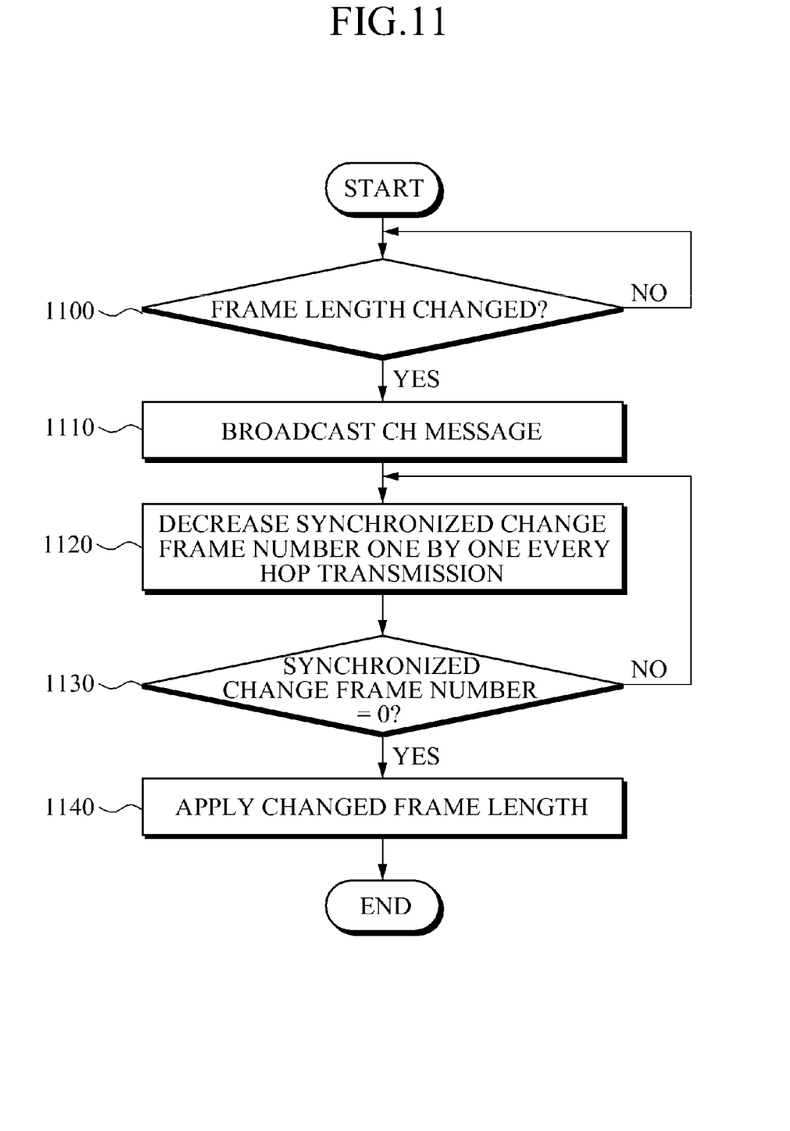
FIG. 11 is a flow chart illustrating a scheduling information synchronizing method for a changed frame length of scheduling information according to an exemplary embodiment of the present invention.

FIG. 11 is a flow chart illustrating a scheduling information synchronizing method for a changed frame length of scheduling information according to an exemplary embodiment of the present invention.

In operation 1100, if a frame length becomes longer in a cluster after BSA scheduling, in operation 1110, a cluster head node of the cluster sends a cluster head message including information about a new frame length to nodes within the entire network.

If a frame length of a cluster is initially set or changed, a cluster head of the cluster has to send a cluster head message to the entire network. In this case, a broadcast flag of the cluster head message is set to 1, and the cluster head message includes cluster head ID of the cluster with the changed frame length and a broadcast hop count.

The cluster head message further includes the new frame length and the time when the new frame length has to be applied, i.e., synchronized change frame number. The synchronized change frame number may be larger than an upper limit of the number of hops of the entire network. That is because the number of frames has to be greater than the upper limit of the number of hops of the entire network to inform the entire network of the cluster head message including the new frame length and the synchronized change frame number.

In this case, all of the nodes within the network having received the cluster head message may recognize a changed broadcast hop count. Each cluster head may recognize a broadcast hop count of each cluster. The sum of twice each broadcast hop count of each cluster is equal to the upper limit of the number of hops of the entire network.

A cluster head which has to change the frame length sets the upper limit of the number of hops of the entire network to the broadcast hop count of the cluster head message and transmits the cluster head message. In this case, the cluster head message includes the synchronized change frame number. The cluster head sets a broadcast flag of the cluster head message to 1 and transmits the cluster head message to the entire network. All of the nodes within the network forward the cluster head message so that the cluster head message may be transmitted over the entire network. A cluster head message with a broadcast flag of 0 is only transmitted within a cluster by a broadcast hop count of the cluster.

In operation 1120, the synchronized change frame number is decreased one by one when the cluster head message is forwarded hop by hop through intermediate nodes. Accordingly, the time when the frame length has to be changed may be counted down over message transmission time. More specifically, in operation 1130, the synchronized change frame number is decreased one by one every frame cycle and finally becomes zero (0), in operation 1140, the changed frame length is applied. Consequently, all of the nodes within the network may be changed to the new frame length at the same time.

Figure 12:
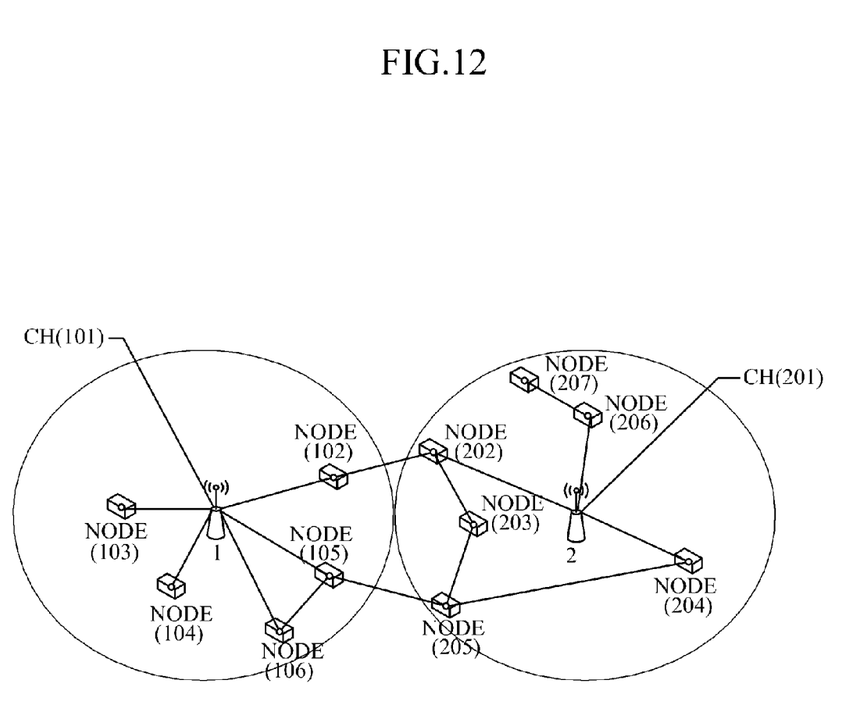
FIG. 12 illustrates a scheduling synchronizing method for a changed frame length of scheduling information according to an exemplary embodiment of the present invention.

FIG. 12 illustrates a scheduling synchronizing method for a changed frame length of scheduling information according to an exemplary embodiment of the present invention. Referring to FIG. 12, a cluster head of Cluster 1 is a node 101 and its broadcast hop count is 1. A cluster head of neighboring Cluster 2 is a node 201 and its broadcast hop count is 2. Accordingly, an upper limit of the number of hops of the entire network is $\{(1+2)\times2\}=6$. This is the number of hops between the node 105 and the node 205. Accordingly, the number of hops between any nodes in Clusters 1 and 2 does not exceed six (6). That is, all of the nodes in the two clusters may receive the cluster head message within six hops. Accordingly, if the synchronized change frame number is set to be larger than the upper limit of the number of hops of the entire network, all of the nodes may safely receive the cluster head message within the time. Accordingly, it is possible to safely change the frame length at the same time.

Figure 13:
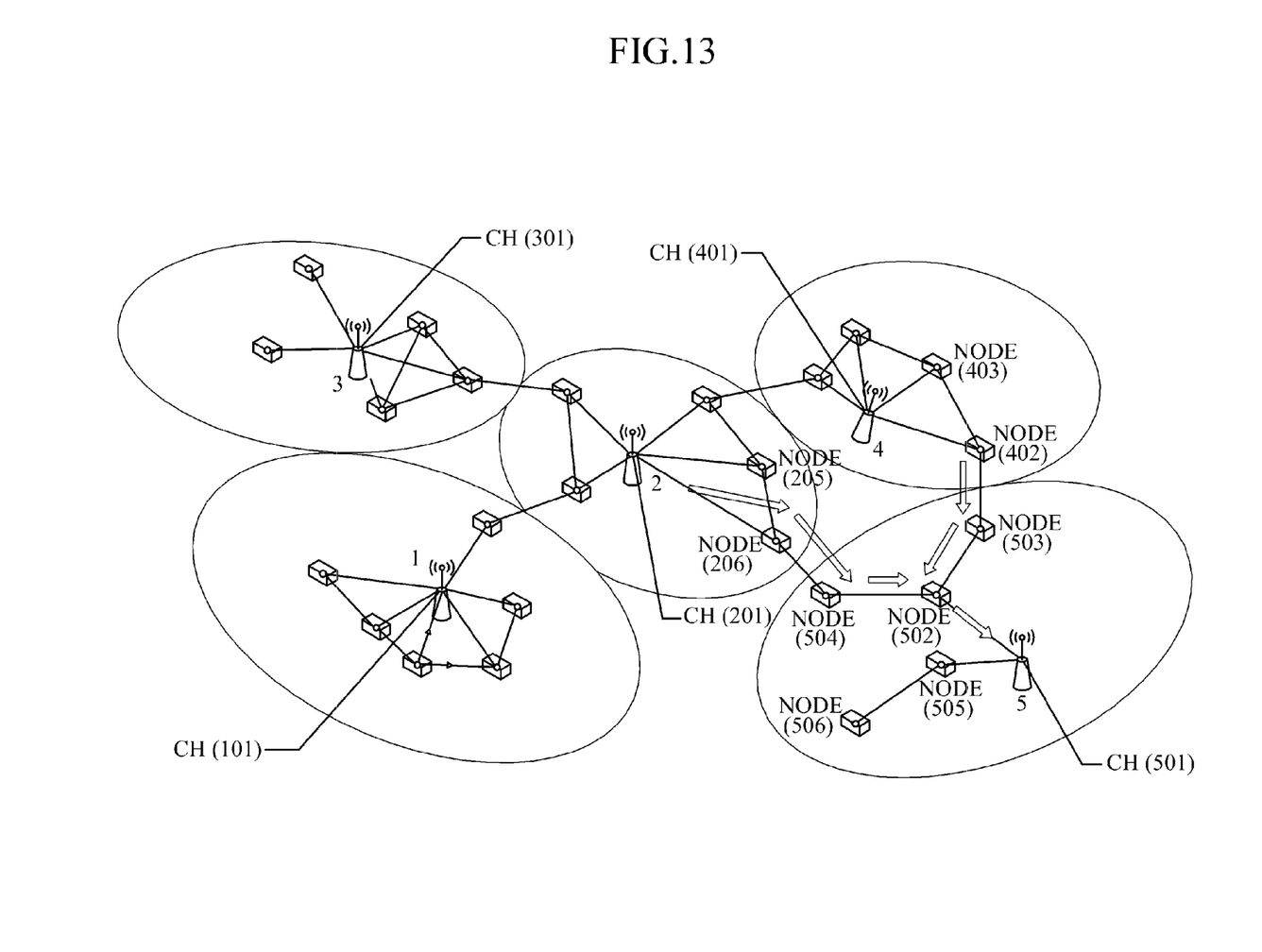
FIG. 13 illustrates a scheduling synchronizing method for a changed frame length of scheduling information in a plurality of clusters according to an exemplary embodiment of the present invention.

FIG. 13 illustrates a scheduling synchronizing method for a changed frame length of scheduling information in a plurality of clusters according to an exemplary embodiment of the present invention. In FIG. 13, Cluster 5 performs resource allocation in the same scheduling method as Clusters 1 and 2. More specifically, cluster head node 501 of Cluster 5 receives cluster information from the cluster head node 201 of Cluster 2 and cluster head node 401 of Cluster 4 and link information and resource allocation location information from edge nodes 201, 205 and 206 of Cluster 2 and edge nodes 401, 402 and 403 of Cluster 4, and performs BSA scheduling in the above-mentioned manner.

Figure 14:
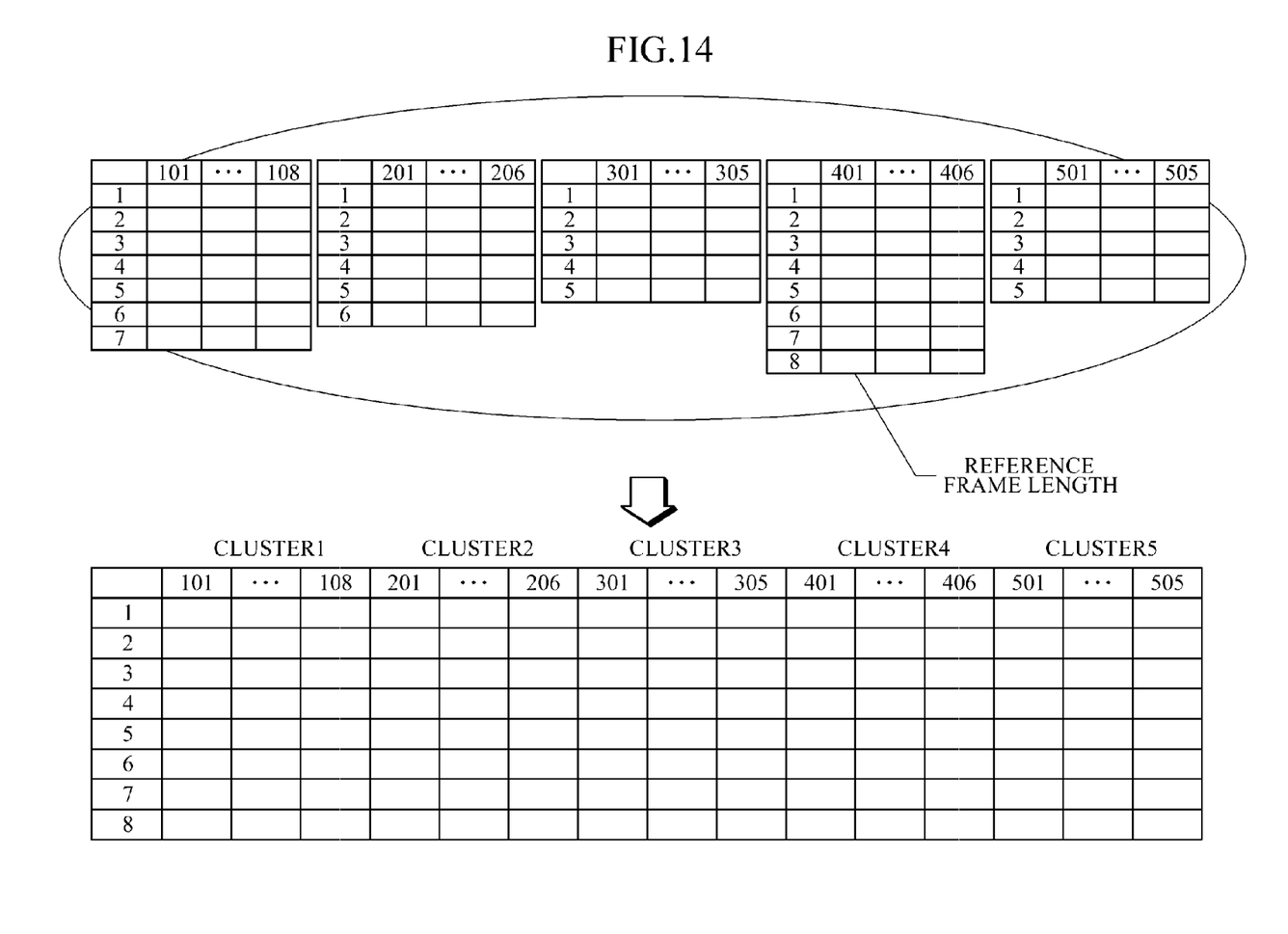
FIG. 14 illustrates a change in schedule due to cluster integration according to an exemplary embodiment of the present invention.

FIG. 14 illustrates a change in schedule due to cluster integration according to an exemplary embodiment of the present invention. After the cluster with the largest ID(5) completes the resource allocation, the schedule is integrated with the reference frame length. As described above, the reference frame length is the longest of frame lengths of the clusters.

As apparent from the above description, by distributing operations requiring a great deal of calculations in a large-scale ad hoc network to a plurality of nodes, it is possible to improve an energy efficiency of nodes and reduce the time consumed in resource allocation for the entire network.

Since a conventional broadcast scheduling algorithm (BSA) requires network connection information of all nodes within the network to perform operations, adding and replacing nodes is require rescheduling and resource reallocation for the entire network. In this case, it is difficult to perform a normal communication until the resource allocation is completed. According to the present invention, however, since the resource allocation and scheduling are only performed in a cluster including nodes which are added or replaced, the other nodes can perform a normal communication. Further, it is possible to minimize energy consumption in adding or replacing the nodes and rapidly recover the communication.

In addition, for an extended frame length after frame synchronization, each cluster can perform additional scheduling using BSA. If there is a change in a cluster after the scheduling and resource allocation for the entire network, only the changed cluster is subject to rescheduling. Hence, it is possible to reduce the transmission rescheduling time for a large-scale network.

Furthermore, since the scheduling is performed cluster by cluster and each cluster performs scheduling with reference to scheduling information of neighboring clusters which have completed scheduling, it is possible to perform transmission collision-free scheduling.

Additionally, after clusters sequentially perform scheduling for resource allocation, all frame lengths are matched based on scheduling information of a cluster with a longest frame length. By matching the frame lengths of the clusters within the network and performing frame synchronization for all of the clusters, it is possible to prevent signal interference due to transmission collision between nodes every time frame.

The present invention can be implemented as computer readable codes in a computer readable record medium. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to is computer systems over a network, in which computer readable codes may be stored and executed in a distributed manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A scheduling method of nodes in a wireless ad hoc network, comprising:
forming a plurality of clusters including at least one node within the network;
selecting a cluster head among nodes included in each of the clusters;
allocating resources for a first cluster to set a transmission schedule for the first cluster;
transmitting the transmission schedule for the first cluster from the cluster head of the first cluster to an edge node of the first cluster;
transmitting the transmission schedule for the first cluster from the edge node of the first cluster to an edge node of the second cluster;
transmitting the transmission schedule for the first cluster from the edge node of the second cluster to the cluster head of the second cluster;
allocating resources for the second cluster to set a transmission schedule for the second cluster based on the transmission schedule of the first cluster; and
after selecting the cluster head, assigning cluster IDs to the clusters in an ascending sequence from the cluster with the most nodes to the cluster with the least nodes,
wherein resources are allocated to each of the clusters sequentially in order of cluster ID.

2. The scheduling method of claim 1, further comprising, after completing the resource allocation for the second cluster, transmitting, by the cluster head of the second cluster, a cluster head message including scheduling information to other nodes within the second cluster.

3. The scheduling method of claim 1, wherein transmitting the transmission schedule for the first cluster from the edge node of the first cluster to an edge node of the second cluster includes transmitting a hop count corresponding to a number of intermediate nodes between the edge node of the first cluster and the cluster head of the first cluster.

4. The scheduling method of claim 3, wherein a cluster head message comprises a broadcast hop count which is a largest hop count received from the edge node of the corresponding cluster.

5. The scheduling method of claim 4, wherein the cluster head message further comprises a remaining hop count corresponding to a number of transmission hops of the header message from the cluster head of the corresponding cluster.

6. The scheduling method of claim 4, wherein the cluster head message comprises a flag to indicate if the cluster head message is sent to nodes within a corresponding cluster or to nodes within the network.

7. The scheduling method of claim 2, wherein, after transmitting the transmission schedule for the first cluster, if the transmission schedule for the first cluster is changed, the cluster head of the first cluster transmits a header message including changed schedule information to other nodes within the first cluster.

8. The scheduling method of claim 1, wherein selecting the cluster head comprises selecting a node having a most number of links within a cluster.

9. The method of claim 1, further comprising, after allocating resources for the second cluster, creating an integrated transmission schedule by integrating the transmission schedule of the first cluster and the transmission schedule of the second cluster.

10. The scheduling method of claim 9, wherein creating the integrated transmission schedule further comprises:
determining a longest frame length from among schedules to be integrated; and
setting the frame length of the integrated schedule to the longest frame length,
wherein the schedules to be integrated include at least the transmission schedule for the first cluster and the transmission schedule for the second cluster.

11. The scheduling method of claim 10, further comprising, for a cluster whose frame length has been increased by the setting the frame length of the integrated schedule to the longest frame length, performing additional scheduling for each of the clusters.

12. The scheduling method of claim 1, wherein allocating resources for the first and second clusters comprises performing scheduling by broadcast scheduling algorithm (BSA).

13. A scheduling method of nodes in a wireless ad hoc network, comprising:
forming a plurality of clusters including at least one node within the network;
selecting a cluster head among nodes included in each of the clusters;
allocating resources for a first cluster to set a transmission schedule for the first cluster;
transmitting the transmission schedule for the first cluster from the cluster head of the first cluster to an edge node of the first cluster;
transmitting the transmission schedule for the first cluster from the edge node of the first cluster to an edge node of the second cluster;
transmitting the transmission schedule for the first cluster from the edge node of the second cluster to the cluster head of the second cluster;
allocating resources for the second cluster to set a transmission schedule for the second cluster based on the transmission schedule of the first cluster; and
after allocating resources for the second cluster, creating an integrated transmission schedule by integrating the transmission schedule of the first cluster and the transmission schedule of the second cluster, determining a longest frame length from among schedules to be integrated, and setting the frame length of the integrated schedule to the longest frame length,
wherein the schedules to be integrated include at least the transmission schedule for the first cluster and the transmission schedule for the second cluster.

* * * * *